United States Patent Office 2,838,703
Patented June 10, 1958

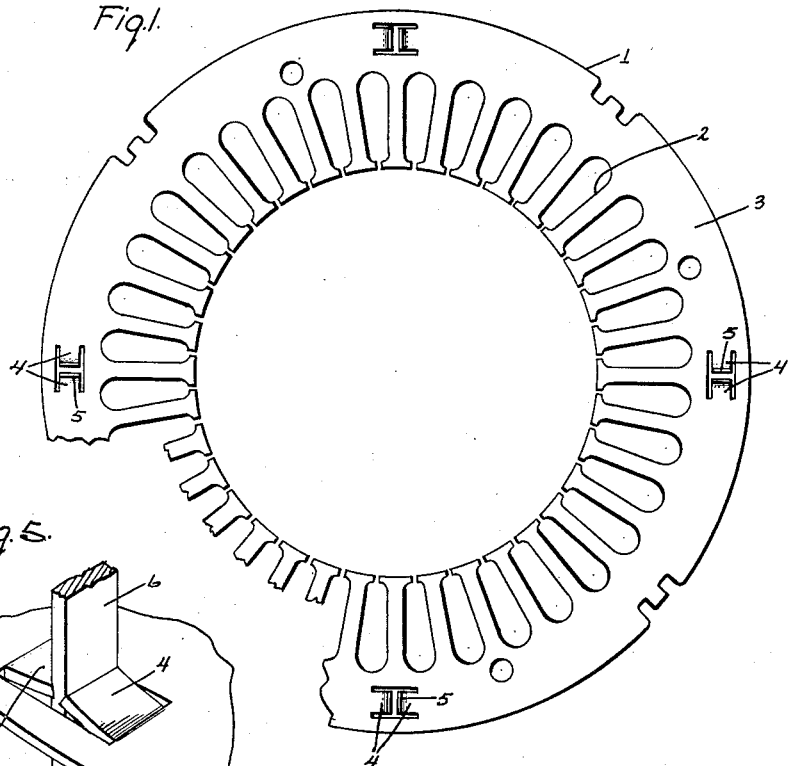
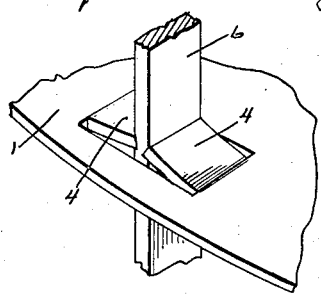
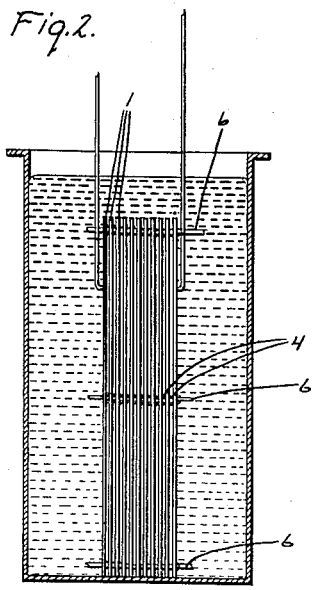
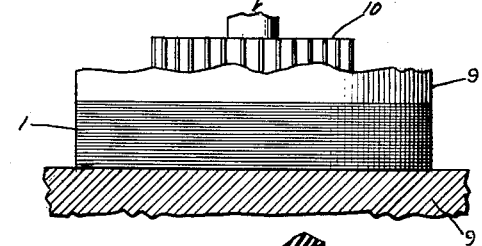
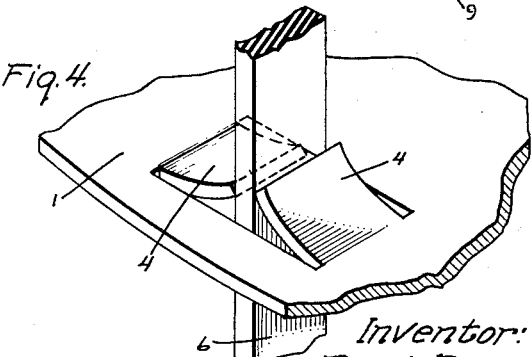

2,838,703

ASSEMBLY OF STACKED LAMINATIONS AND PROCESS FOR MAKING SAME

Roy L. Balke, Fort Wayne, Ind., assignor to General Electric Company, a corporation of New York Application January 18, 1957, Serial No. 635,016

5 Claims. (Cl. 310—217)

This invention relates to electrical apparatus, and more particularly to a process for stacking magnetic core laminations.

There are at the present time many different methods of securing together a group of laminations so as to form a stack which may be used as, for example, a magnetic core in electrical apparatus. All of the methods of securing together the stack of laminations which are presently commonly known require that as soon as the laminations are assembled, they be in close contact together. In other words, as soon as the holding means is provided, the laminations are substantially in their final relationship. This has proved acceptable in the past; however, at the present time, there is increasing interest in treating the individual laminations with a bonding material so that the laminations may be pressed together and held in their final relationship by the bonding material. It is, of course, possible to apply the material to each lamination individually and then stack them together. However, this is unduly time consuming, and where, as is usual, the material is in its liquid state when applied, creates a difficult situation insofar as handling of the laminations is concerned. However, to date, such an approach has been necessary since, if the laminations were stacked before applying the material, it was not possible to maintain them in alignment while positively providing enough spacing for the material to coat each entire lamination. It is thus most desirable to provide a process which will permit the laminations to be stacked in such a manner that they may all be thoroughly coated when dipped in a bonding material.

It is, therefore an object of this invention to provide an improved process for stacking laminations so that after they have been stacked, there will still be substantial space between adjacent laminations.

A further object of the invention is to provide a process which will permit a stack of laminations to be dipped in material with the laminations so spaced that all parts of them including the faces of adjacent laminations will receive an adequate coating.

A further object of the invention is to provide an improved construction for securing together laminations in a stack.

In one aspect thereof, the invention provides a process for assembling a plurality of substantially flat laminations into a stack. The first step is to punch a tang in each lamination out of the plane thereof so as to form a slot in the lamination. A bar of soft stiff material is then inserted into the slot of each lamination until the laminations which are to form the stack are all mounted on the bar. A predetermined pressure is then applied against the two end laminations, while the laminations are maintained in alignment, to press the laminations against each other. This forces the tangs back substantially into the planes of the respective laminations so that the tangs embed themselves into the bar so as to hold the laminations tightly together.

The features of the invention which are believed to be novel are set forth with particularity in the appended claims. The invention itself, however, may best be understood by reference to the following description taken in connection with the accompanying drawing.

In the drawing, Figure 1 is a plan view of a lamination formed in accordance with the process of the invention;

Figure 2 is a side view of a tank of liquid bonding material showing a plurality of laminations loosely assembled into a stack submerged in the material;

Figure 3 is a side view of apparatus for performing another step of the improved process;

Figure 4 is an enlarged fragmentary view in perspective showing a bar extending through the slot formed in the lamination after part of the process has been completed; and Figure 5 is an enlarged fragmentary view in perspective of a bar and a lamination after completion of the process.

Referring now to the figures of the drawing, there is shown in Figure 1 a lamination 1 of the type frequently used in forming the magnetic stator core of a dynamoelectric machine. Lamination 1 is provided in the normal manner with slots 2 which are adapted to receive windings (not shown) so that when a plurality of laminations 1 are stacked together and the windings are provided thereon, a complete magnetic core is provided. Lamination 1 includes a yoke portion 3 which has tangs 4 stamped at points where the magnetic restriction will not be over normal tolerances. As can be seen by reference to Figure 4, tangs 4, in addition to being punched are bent out of the plane of the remainder of the lamination 1 by the punching operation. This fact, together with the material removed by the punching operation, provides a slot 5 in the lamination. It will be seen that a plurality of groups of tangs 4 may be provided around the periphery of lamination 1. The exact number of such groups is not critical; for example, four may be provided with complete satisfaction, as shown. Also, while other arrangements (including groups of one tang each) will readily come to mind, the tangs of each group are preferably formed end to end toward each other so as to define slot 5 between them.

Once tangs 4 have been formed as described above, a bar 6 is inserted into the slots 5 of successive laminations until the total number of laminations which is to form the stack is assembled on bar 6. The bar is formed of a material which, while soft and yielding to high forces, is stiff enough so that it will act as a rigid member while it is being inserted into the slots 5 and while it is supporting the laminations in alignment (as will be more fully described below). For instance, it has been found that where a bonding resin is to be used eventually to hold the laminations together, a bar made of pure rag paper will provide satisfactory results.

Once the laminations have been mounted on the bars 6, they are then ready to be immersed in the bonding material 7 as shown in Figure 2. It will be seen that the tangs 4, by virtue of the fact that they extend out of the plane of the lamination in which they are formed, maintain each lamination spaced from the lamination adjacent to it so that the bonding material will be able to flow freely between the laminations so as to effect complete coverage thereof. While the type of material used for bonding is not intended to form any part of this invention, a general example of resins which may be used, is for example the epoxide resin group.

After the dipping operation shown in Figure 2, laminations 1 are then ready to be compressed into a stack as shown at 8 in Figure 3. This is effected by placing the laminations, with bar 6 still extending through them, between two compressing members 9 and exerting force on the two end laminations with members 9 to press the laminations tightly together until all of the tangs 4 have been forced back substantially into the planes of the laminations in which they are respectively formed so as to embed themselves in bar 6 (Figure 5). During the step of compressing laminations 1 into a stack, as shown in Figure 3, it is generally desirable to provide a suitable aligning member such as plug 10 which fits snugly within the bore of the laminations so as to provide exact alignment when they are put into their final position.

After the compressing operation, tangs 4 will extend into bar 6, shown in Figure 5, to hold each lamination in laterally abutting relation to the others. Thus, the stack will be held together during any subsequent operations that need to be performed to dry the bonding material 7 applied to the laminations. The co-action of bars 6 with tangs 4 provides a highly desirable method of insuring that both sides of each lamination be entirely covered by the bonding material, and that the stack have its laminations properly maintained together while the material is dried.

It will be seen that entirely apart from the bonding action of material 7, there is a strong holding force provided by the embedding of tangs 4 in bar 6. Where the bar is of paper, as has been suggested above, this holding force is necessarily limited in nature and is probably not suitable for prolonged use. However, if a stronger and more permanent bar of relatively soft stiff non-magnetic material such as, for instance, copper is used, the coaction of the tangs with the bar may be entirely depended upon to hold laminations 1 together without any need for bonding material.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A process for assembling a plurality of substantially flat laminations into a stack comprising the steps of punching a tang in each lamination out of the plane thereof so as to form a slot in the lamination, inserting a bar of soft stiff material into the slot of each lamination until all the laminations which are to form the stack are mounted on said bar with said tangs holding said laminations in a spaced apart relationship, applying a treating material between said laminations while they are in said spaced apart relationship, and thereafter and pressing said laminations tightly together while they are maintained in alignment thereby forcing said tangs substantially into the planes of the respective laminations and causing the ends of said tangs to embed themselves in said bar.

2. A process for assembling a plurality of substantially flat laminations into a stack comprising the steps of punching a plurality of pairs of tangs in each lamination out of the plane thereof, each of said pairs of tangs being formed end to end toward each other so as to form a slot therebetween, inserting a plurality of bars of soft stiff material respectively into the slots of each lamination until all the laminations which are to form the stack are mounted on the bars with said tangs holding said laminations in a spaced apart relationship, applying a treating material between said laminations while they are in said spaced apart relationship, and thereafter and pressing the laminations tightly together while they are maintained in alignment thereby forcing said tangs substantially into the planes of the respective laminations and causing the ends of said tangs to embed themselves into said bars.

3. A process for assembling a plurality of substantially flat laminations into a stack comprising the steps of punching a plurality of pairs of tangs in each lamination out of the plane thereof, each of said pairs of tangs being formed end to end toward each other so as to form a slot therebetween, inserting a plurality of bars of soft stiff material respectively into the slots of each lamination until all the laminations which are to form the stack are mounted on the bars with said tangs holding said laminations in a spaced apart relationship, immersing the laminations in a bonding material, while they are in said spaced apart relationship, and thereafter pressing the laminations tightly together while they are maintained in alignment thereby forcing said tangs substantially into the planes of the respective laminations and causing the ends of said tangs to embed themselves into said bars.

4. A dynamoelectric machine core formed of a plurality of laterally abutting laminations each having a slotted portion adapted to receive windings and having a yoke portion, each of said laminations having a plurality of pairs of tangs formed in the yoke portion, each pair of tangs being formed end to end toward each other so as to provide a slot therebetween, said laminations having their respective slots in alignment, rectangular bars of soft stiff material extending respectively through all said slots, the ends of said pairs of tangs being respectively embedded in said bars.

5. A method for assembling a plurality of substantially flat laminations into a stacked magnetic core, comprising the steps of forming a tang and an adjacent slot in each lamination, assembling said laminations into a stack with an assembly bar extending through the slots of said laminations and with the tangs holding said laminations in a spaced apart relationship, applying a treating material between said laminations while they are in said spaced apart relationship, and thereafter pressing said laminations tightly together while simultaneously applying aligning means thereto, said pressing causing said laminations to move into intimate contact with each other, with said tangs being moved substantially into the planes of their respective laminations and the ends of the tangs being embedded in said bar.

References Cited in the file of this patent

UNITED STATES PATENTS

| | | |
|---|---|---|
| 1,158,463 | Eaton | Nov. 2, 1915 |
| 1,467,938 | Janette | Sept. 11, 1923 |
| 2,673,390 | Broberg | Mar. 30, 1954 |

FOREIGN PATENTS

| | | |
|---|---|---|
| 917,626 | Germany | Sept. 9, 1954 |